US012486702B2

(12) United States Patent
Erskine et al.

(10) Patent No.: US 12,486,702 B2
(45) Date of Patent: Dec. 2, 2025

(54) SLIDING DOOR WITH BRAKING SYSTEM

(71) Applicant: Taylor Made Group, LLC, Gloversville, NY (US)

(72) Inventors: Edward J. Erskine, Benson, NY (US); Philip A. Oakes, Middle Grove, NY (US); Corey King, Rochester, NY (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 228 days.

(21) Appl. No.: 17/951,163

(22) Filed: Sep. 23, 2022

(65) Prior Publication Data

US 2023/0086262 A1 Mar. 23, 2023

Related U.S. Application Data

(60) Provisional application No. 63/247,372, filed on Sep. 23, 2021.

(51) Int. Cl.
*E05D 15/06* (2006.01)
*E05D 15/08* (2006.01)

(52) U.S. Cl.
CPC ..... *E05D 15/0626* (2013.01); *E05D 15/0634* (2013.01); *E05D 15/0639* (2013.01); *E05D 15/08* (2013.01); *E05D 15/063* (2013.01); *E05Y 2201/684* (2013.01); *E05Y 2900/132* (2013.01); *E05Y 2900/148* (2013.01)

(58) Field of Classification Search
CPC ... E05D 15/08; E05D 15/0652; E05D 15/063; E05D 15/0634; E05D 15/0656; E05D 15/0626; E05D 15/0621; E05D 15/0639; E05D 2015/586; E05Y 2900/132; E06B 9/04; E06B 9/02; E06B 3/4636
USPC .................................................... 49/409, 425
See application file for complete search history.

(56) References Cited

U.S. PATENT DOCUMENTS 1,190,078 A * 7/1916 Anger .................. E05D 15/063 16/89
2,726,420 A * 12/1955 Kemp ................. E05D 15/0652 16/87 R
2,909,802 A * 10/1959 Gang .................. E05D 15/0634 49/411
3,425,162 A * 2/1969 Halpern .............. E05D 15/0634 16/DIG. 34

(Continued)

OTHER PUBLICATIONS

U.S. Office Action dated Nov. 8, 2023 issued in U.S. Appl. No. 17/951,174, 11 pp.

*Primary Examiner* — Justin B Rephann
(74) *Attorney, Agent, or Firm* — NIXON & VANDERHYE P.C.

(57) ABSTRACT

A sliding door assembly includes a door frame with a top trim member, a bottom sill, and side jambs connected between the top trim member and the bottom sill, and a primary sliding panel secured in the door frame. The top trim member includes a track configured to support a weight of the primary sliding panel and prevent the primary sliding panel from coming off the track. Other features include an interlock mechanism to limit relative movement using multiple sliding doors and a brake mechanism to secure the doors in position when the door handle is released. A drop window includes features to accommodate for manufacturing tolerances and box frame assemblies that are out of square.

19 Claims, 16 Drawing Sheets

(56) References Cited

U.S. PATENT DOCUMENTS 3,473,266 A * 10/1969 Miller ................. E05D 15/0652 49/504
3,643,529 A * 2/1972 Bright ................... E06B 3/4663 16/96 R
3,696,560 A * 10/1972 Hallin ................. E05D 15/0634 16/99
3,852,916 A * 12/1974 Laby ................... E05D 15/0634 16/105
3,925,933 A * 12/1975 Reuter ................ E05D 15/0652 16/97
4,073,034 A * 2/1978 Martens ................ E05D 15/063 16/87 R
4,241,686 A 12/1980 Westphalen
4,281,435 A * 8/1981 Winter .................... E05F 5/003 16/96 R
4,404,770 A * 9/1983 Markus ................... E05F 5/003 49/235
4,458,449 A * 7/1984 Breuer .................... E05D 15/08 49/411
4,464,863 A 8/1984 Chikaraishi et al.
4,742,645 A * 5/1988 Johnston ............... E06B 3/4654 49/504
4,833,829 A 5/1989 Wilson
4,888,915 A 12/1989 Goldenberg
5,163,204 A 11/1992 Jackson
5,224,297 A 7/1993 Watkins
5,450,693 A * 9/1995 Tarrega ................... E05D 13/04 49/411
5,598,666 A * 2/1997 Kurth .................... E05D 15/063 4/557
6,131,340 A 10/2000 Clark et al.
6,336,247 B1 * 1/2002 Schnoor .............. E05D 15/0652 160/214
6,381,904 B1 * 5/2002 Tedescucci .............. A47K 3/34 49/413
6,516,566 B2 * 2/2003 Finke .................. E05D 15/0652 49/130
6,557,303 B2 * 5/2003 Finke .................... E05F 15/632 49/404
6,698,138 B1 * 3/2004 Lin ..................... E05D 15/0639 16/105
7,228,659 B2 * 6/2007 Romero .................. E05D 15/48 16/268
7,401,566 B1 7/2008 Miknich
7,555,871 B1 * 7/2009 Neal ................... E05D 15/0621 52/207
7,712,258 B2 * 5/2010 Ewing ................. E05D 15/0634 16/105
7,730,670 B2 * 6/2010 Whitaker ............ E05D 15/0652 49/425
8,117,784 B2 * 2/2012 Tarrega Illoret ...... E05D 15/063 16/97
8,297,334 B2 * 10/2012 Chu .......................... E06B 9/36 160/202
8,393,114 B2 * 3/2013 Haab ....................... E05F 5/003 16/98
8,579,006 B2 * 11/2013 Levin ...................... E04B 2/827 160/184
8,850,659 B2 * 10/2014 Ewing ................. E05D 15/0634 16/105
8,991,099 B1 * 3/2015 Erskine ................... E05D 15/50 49/127
9,038,316 B2 * 5/2015 Von Gerichten ...... E05D 15/063 49/425
9,234,376 B2 * 1/2016 Trulaske, Sr. ...... E05D 15/0652
9,486,114 B2 * 11/2016 Ball ......................... A47K 3/00
10,123,660 B2 * 11/2018 Ball ...................... E05D 15/063
10,125,528 B2 * 11/2018 Wypych .............. E05D 15/0652
10,246,163 B2 4/2019 Erskine et al.
2003/0201074 A1 * 10/2003 Schnoor ................ E06B 3/4636 160/90
2005/0098060 A1 * 5/2005 Bigda ................. E05D 15/1007 105/378
2005/0150168 A1 * 7/2005 Romero ................ E05F 15/643 49/409
2006/0137252 A1 6/2006 Kriese et al.
2006/0207184 A1 * 9/2006 Whitaker .............. E05D 15/063 49/409
2006/0236613 A1 * 10/2006 Ewing ................. E05D 15/0656 49/410
2007/0068435 A1 3/2007 Martin
2009/0100760 A1 * 4/2009 Ewing ........................ E05C 7/06 49/410
2009/0120006 A1 * 5/2009 Vincent ................. E05D 15/063 49/414
2010/0242370 A1 * 9/2010 Trulaske, Sr. .......... E05D 13/14 49/410
2011/0072577 A1 * 3/2011 Luedke .................... A47K 3/34 4/607
2012/0318467 A1 * 12/2012 Levin ...................... E04B 2/827 160/194
2013/0111702 A1 * 5/2013 Ewing ................. E05D 15/0634 29/428
2014/0075871 A1 * 3/2014 Haan ......................... E06B 1/00 52/309.1
2014/0090301 A1 * 4/2014 Takahashi ............. E05F 15/632 49/360
2015/0075075 A1 * 3/2015 Erskine ..................... E05D 7/00 49/188
2016/0166120 A1 * 6/2016 Ball ...................... E05D 15/063 4/607
2016/0201373 A1 * 7/2016 Höher ..................... E05D 15/08 49/427
2017/0130504 A1 5/2017 Westgarth et al.
2017/0204644 A1 7/2017 Mc Mullen, Jr. et al.
2017/0247928 A1 8/2017 Haeussler et al.
2017/0342755 A1 11/2017 Whitehurst et al.
2018/0230728 A1 * 8/2018 Downey ................. E05F 5/003
2018/0298666 A1 10/2018 Andersson et al.
2019/0039690 A1 2/2019 Erskine et al.
2019/0119966 A1 4/2019 Barbieri
2019/0330889 A1 * 10/2019 Cano ........................ A47K 3/34
2020/0170455 A1 * 6/2020 Thews ................ E05D 15/0652
2021/0270068 A1 * 9/2021 Veilleux .............. E05D 15/0652
2022/0154503 A1 * 5/2022 Kenyon .............. E05D 15/0656

* cited by examiner

SLIDING DOOR WITH BRAKING SYSTEM

CROSS-REFERENCES TO RELATED APPLICATIONS

This application claims the benefit of U.S. Provisional Patent Application No. 63/247,372, filed Sep. 23, 2021, the entire content of which is herein incorporated by reference.

STATEMENT REGARDING FEDERALLY SPONSORED RESEARCH OR DEVELOPMENT (NOT APPLICABLE)

BACKGROUND

The invention relates to a sliding door assembly and, more particularly, to a multi-panel sliding door system including a handle release braking system and a panel interlock arrangement.

Unlike sliding doors in a residential home, sliding doors in a marine environment are subjected to a multitude of external forces during use and operation. For example, when a boat is in use, forces from waves or weather or the like can cause a sliding door to come off its track. The same forces could cause sliding doors to open or close undesirably.

Existing designs are difficult to adjust, and/or adjustments cause the doors to become unstable. Unstable doors tend to rattle in use, which is undesirable.

In order to close off a large opening, it may be desirable to include multiple sliding doors in a single door assembly. An exemplary design may include one fixed panel and two sliding panels. A trim member on the outward door may engage a corresponding trim member on an inward door only when the outward door is fully closed. As the outward door is opened, the inward door is movable relative to the outward door and the fixed panel, which is undesirable. Once the outward door reaches the inward door, a bumper on the outward door will impact the inward door and push the inward door open. The lack of any connection between the doors as the outward door is being opened can result in undesirable contact between the doors and/or awkward door positions. Also, as the outward door is displaced, the inner door is released and can undesirably move.

SUMMARY

The door system of the described embodiments addresses several problems with existing constructions while also facilitating access to various moving parts for maintenance and repair. Framework for the door panels provides secure connections, rollers and sliders for smooth and secure operation. An interlock mechanism prevents a second sliding panel from being displaceable until engaging the first sliding panel in a max open position. Additionally, a brake system secures the doors in place regardless of a position of the doors once the handle is released. The systems of the described embodiments are equally applicable to door assemblies including three or more sliding panels.

In an exemplary embodiment, a sliding door assembly includes a door frame with a top trim member, a bottom sill, and side jambs connected between the top trim member and the bottom sill. A primary sliding panel is secured in the door frame, a primary rail extrusion fixed to the top trim member includes a top rail and a bottom rail, a primary truck is connected between the primary rail extrusion and the primary sliding panel, and a primary roller fixed to the primary truck is secured in rolling engagement with the bottom rail. The top trim member includes a track configured to support a weight of the primary sliding panel and prevent the primary sliding panel from coming off the track.

The roller may include a concave rolling surface. The bottom rail may be convex shaped in complement to the concave rolling surface, where the top rail may be disposed at least partially within an area defined by the concave rolling surface.

The primary truck may be connected to the primary panel via a rivet nut and a hanger bolt.

The sliding door assembly may also include a secondary sliding panel secured in the door frame, where the top trim member may include the track for the primary sliding panel and another track for the secondary sliding panel. A secondary rail extrusion may be fixed to the top trim member and include a top rail and a bottom rail. A secondary truck may be connected between the secondary rail extrusion and the secondary sliding panel, and a secondary roller may be fixed to the secondary truck and secured in rolling engagement with the bottom rail. The primary rail extrusion and the secondary rail extrusion may be fixed to the top trim member side by side.

A height of the primary sliding panel in the door frame may be adjustable.

In another exemplary embodiment, a sliding door assembly includes a door frame including a top door trim member, a bottom sill, and side jambs connected between the top door trim member and the bottom sill. A sliding panel secured in the door frame includes a top panel trim member. A rail extrusion fixed to the top door trim member includes a top rail and a bottom rail, a truck connected to the top panel trim member is positioned between the rail extrusion and the top panel trim member, and a roller fixed to the truck is secured in rolling engagement with the bottom rail.

The top panel trim member may be substantially U-shaped such that the truck extends at least partially into the U-shape. A rivet nut may extend through a bottom of the truck and may be connected to the top panel trim member via a hanger bolt. The sliding panel may be height adjustable via the hanger bolt and a jam screw. In this context, the jam screw may be threaded into the truck and may be accessible via a hole in the top panel trim member. The jam screw may be positionable to engage and connect the truck and the top panel trim member regardless of a height setting of the sliding panel by the hanger bolt.

The top panel trim member may include upper flanges at ends of the U-shape that each include a T-slot configured to receive a glide and/or seal.

Glass for the sliding panel may be secured to the top panel trim member via an adhesive.

The sliding door assembly may further include a bottom trim member secured at a bottom of the sliding panel, where the bottom sill may include a rail over which the bottom trim member may be positioned, and where a height of the rail spans a height adjustment range for the sliding panel. The bottom trim member may include T-slots facing the rail in which glides are disposed and engage opposite sides of the rail.

The sliding door assembly may further include a drop window that includes a window panel movably secured in the door frame, wherein the window panel is displaceable between a closed position and an open position, a motor, a track, a carriage coupled with the track, and a coupling connecting the motor and the window panel. The coupling includes top and bottom plates connected to the motor and the carriage, and the coupling includes a center plate connected to the window panel.

In yet another exemplary embodiment, a drop window includes a window panel movably secured in a window frame, where the window panel is displaceable between a closed position and an open position, a motor, a track, a carriage coupled with the track, and a coupling connecting the motor and the window panel. The coupling includes top and bottom plates connected to the motor and the carriage, and the coupling includes a center plate connected to the window panel.

The top and bottom plates and the center plate may be connected by a pin. The top and bottom plates may include a circular opening for receiving the pin, and the center plate may include an oblong opening for receiving the pin.

BRIEF DESCRIPTION OF THE DRAWINGS

These and other aspects and advantages will be described in detail with reference to the accompanying drawings, in which.

DETAILED DESCRIPTION

Figure 1:
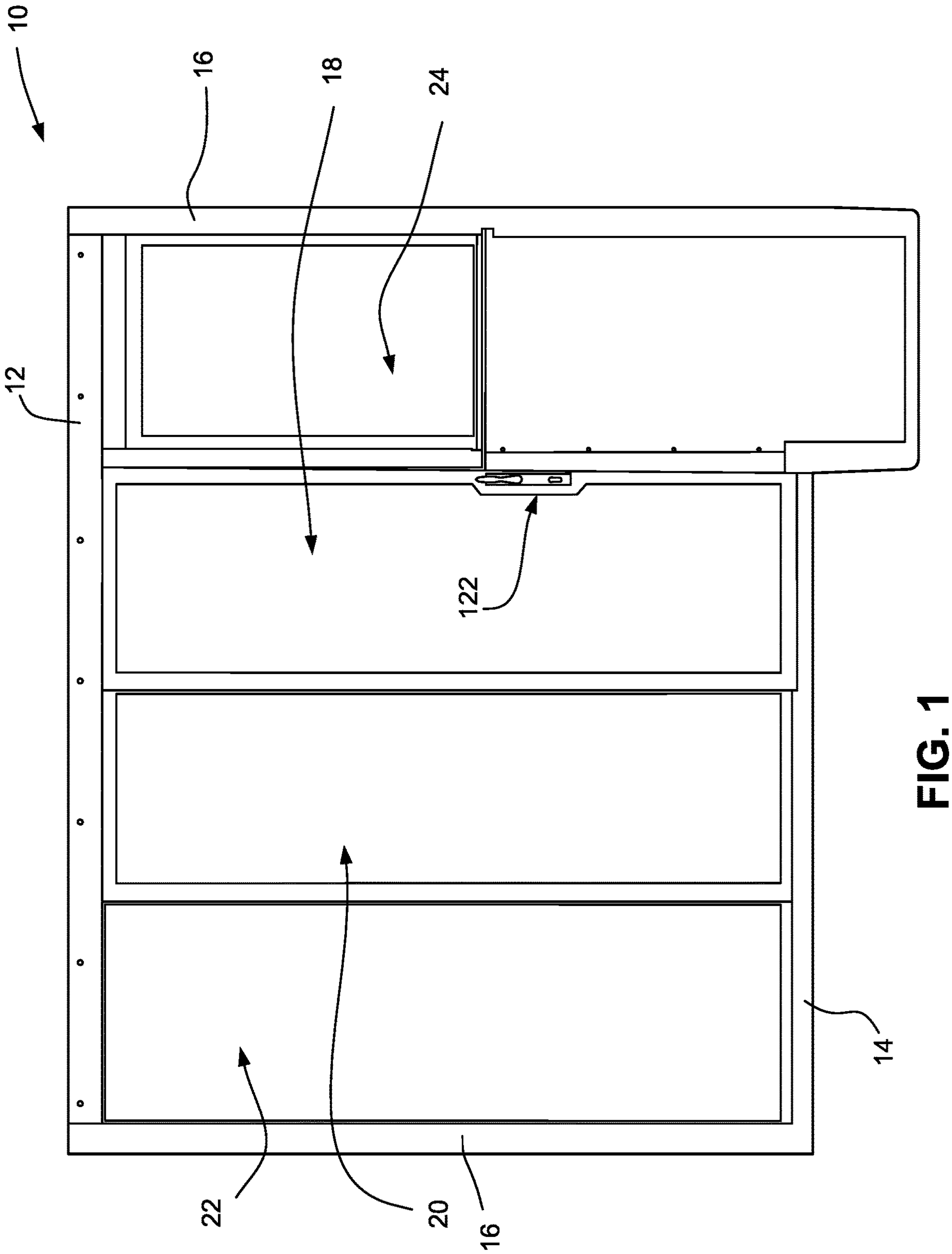
FIG. 1 shows an exemplary configuration of a sliding door assembly according to the described embodiments.

FIG. 1 shows an exemplary configuration of a sliding door assembly according to the described embodiments. Generally, the assembly 10 includes a framework with a top header 12, a bottom sill 14, and a side jamb 16. A primary sliding panel 18, a secondary sliding panel 20 and a fixed panel 22 are secured in the framework. In the exemplary embodiment shown in FIG. 1, the system also includes a drop window 24.

Figure 2:
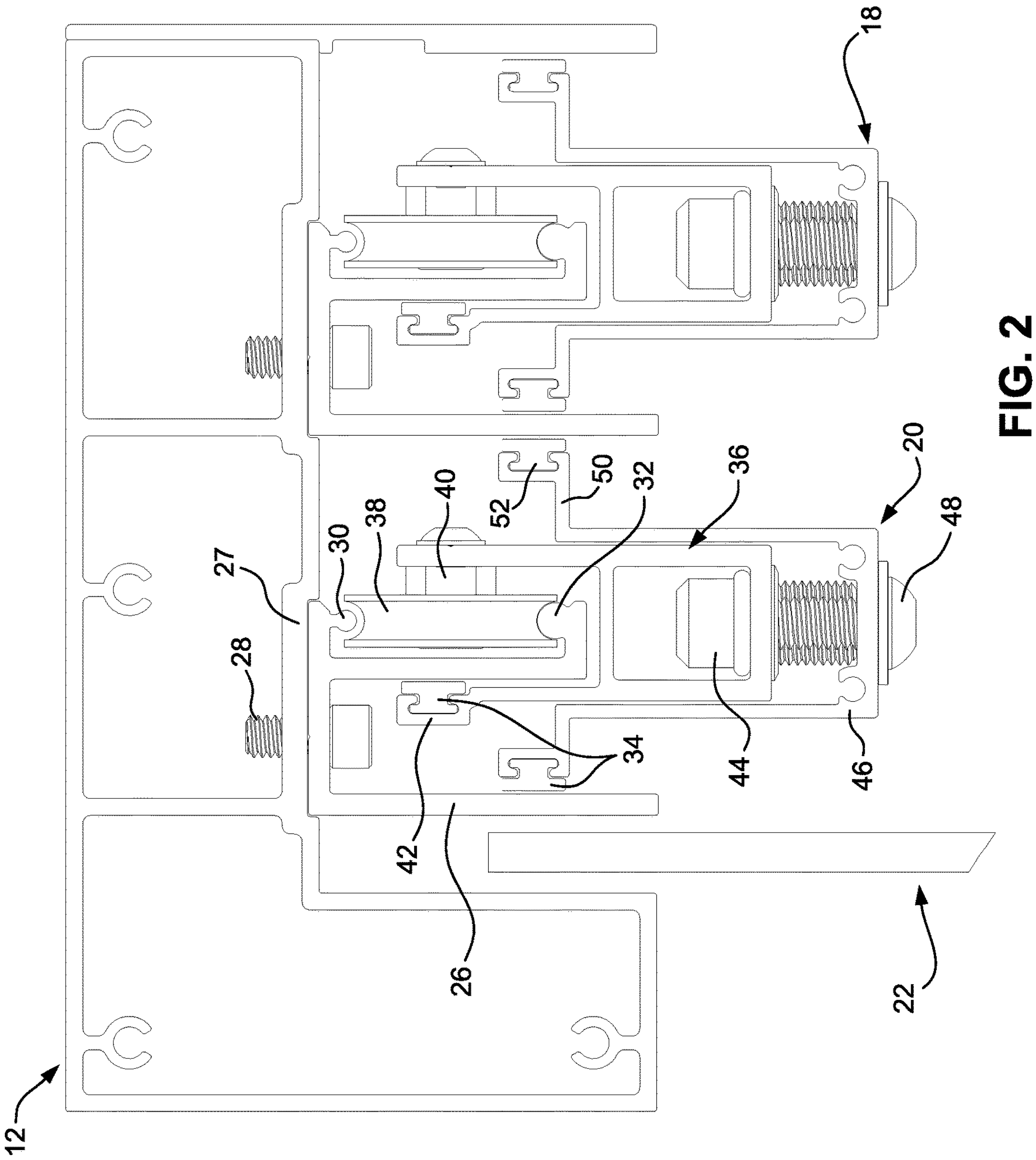
FIG. 2 is an end view of the header showing top connections to the sliding panels.

FIG. 2 is an end view of the header 12 showing top connections to the sliding panels 18, 20. The panels 18, 20 are supported by the header 12 through various connecting brackets. A rail extrusion 26 is secured to the header 12 by a plurality of bolts 28. The rail extrusion 26 includes a top rail 30 and a bottom rail 32. The rail extrusion 26 also includes one or more nylon glides and seals 34. In some embodiments, the header 12 may include recesses 27 to facilitate placement of the rail extrusions 26.

A truck 36 supports a bearing roller 38 via a hub 40. In an exemplary construction, each truck 36 supports at least two bearing rollers 38. The roller is secured between the top rail 30 and the bottom rail 32. In some embodiments, a rolling surface of the roller 38 is concave, and the bottom rail 32 is shaped in a convex complement. The upper rail 30 is slightly smaller than the lower rail 32. The complementary shapes of the roller 38 and bottom rail 32 and the position of the upper rail 30 serve to prevent the roller 38 from coming off its track. The truck 36 also includes a T-slot 42 that receives one of the nylon glides and seals 34 as shown.

A rivet nut 44 (such as the RIVNUT® available from Bollhoff Group) extends through a bottom of the truck 36 and is connected to a top trim member 46 of each of the panels 18, 20 via a hanger bolt 48. The glass for each of the panels 18, 20 is respectively secured to each of the top trim members 46 via an adhesive. In some embodiments, the top trim members 46 are substantially U-shaped with upper flanges 50 each including a T-slot 52 for receiving the nylon glides and seals 34.

Figure 3:
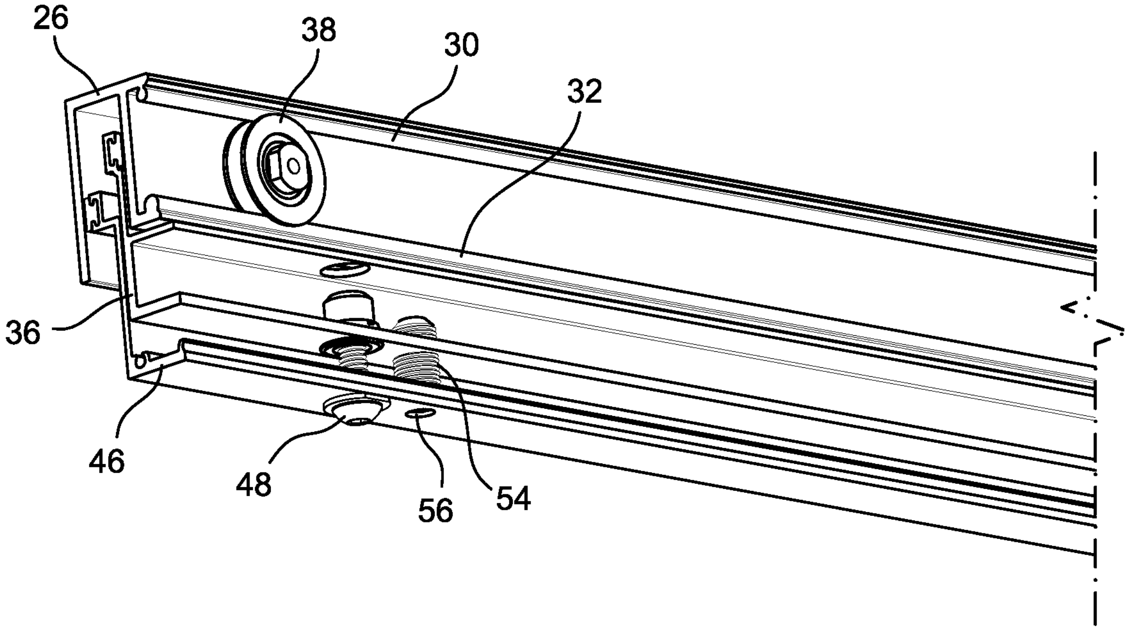
FIG. 3 is a perspective view of the sliding panel top connections.

The sliding panels 18, 20 are adjustable via the hanger bolt 48 and a jam screw 54 (FIG. 3). The jam screw 54 is threaded into the truck 36 and is accessible via a hole 56 in the top trim member 46. In order to lower the door, the hanger bolt 48 is loosened or screwed down to lower the door position, and the jam screw 54 is subsequently adjusted via the access hole 56 to connect the jam screw 54 between the truck 36 and the top trim member 46, which serves to lock the adjustment in place. In order to raise the door, the jam screw 54 is first spaced from the top trim member 46, and the hanger bolt 48 can subsequently be tightened or screwed up to raise the door until the top trim member 46 engages the jam screw 54. The hanger bolt 48 thus provides an upward force, whereas the jam screw 54 provides a downward force to stabilize the panels 18, 20. In some embodiments, the door is adjustable across a range of about 0.36 inches in either direction to accommodate for manufacturing tolerances and the like.

Figure 4:
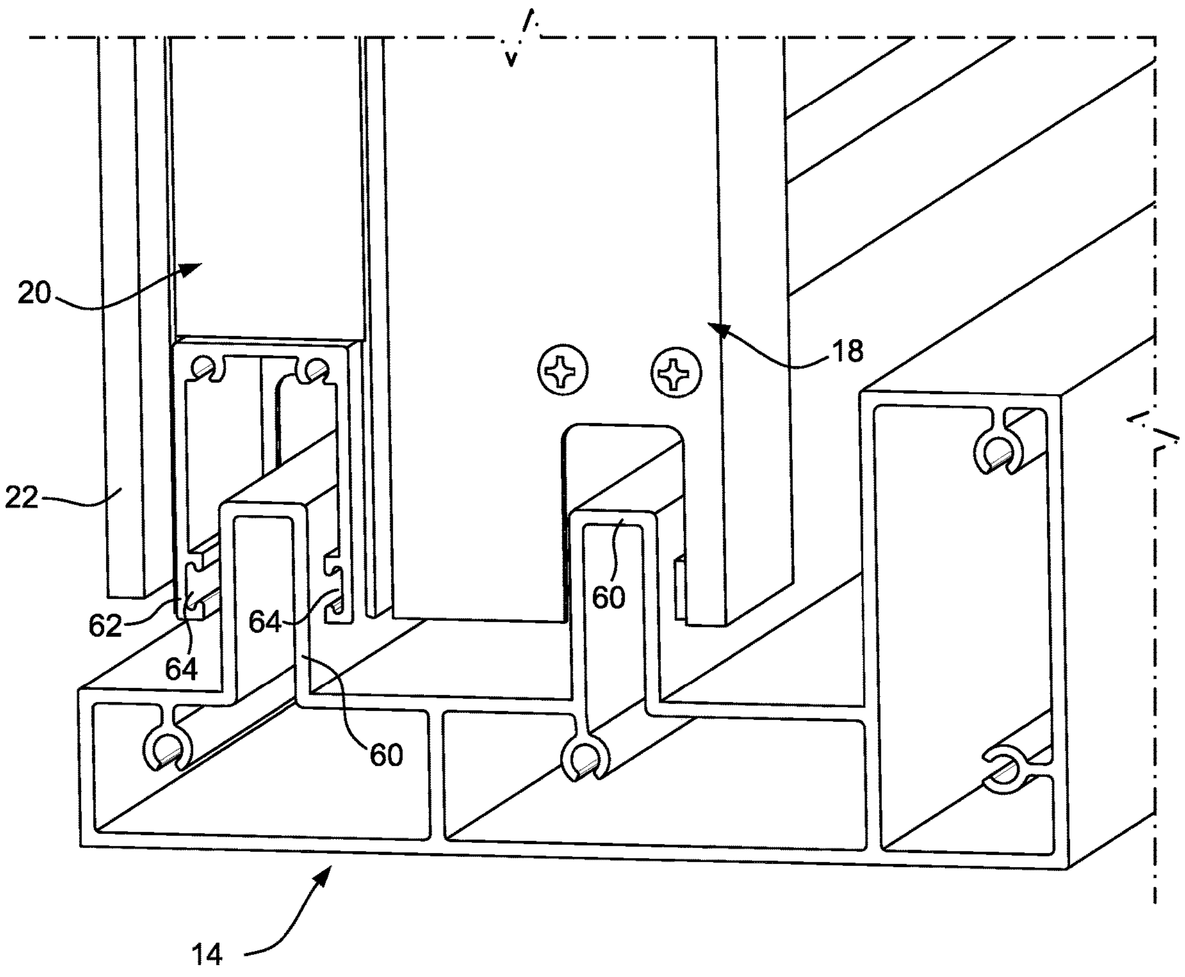
FIG. 4 shows the bottom sill of the door frame.

FIG. 4 shows the bottom sill 14 of the doorframe. The bottom sill 14 includes rails 60 over which a bottom trim member 62 is positioned for each of the sliding panels 18, 20. The T-slots 64 in the bottom trim member 62 engage nylon glides mounted on the outer sides of the rails 60. The nylon glides and T-slots facilitate smooth sliding displacement of the sliding panels 18, 20. A height of the rails 60 enables the panels 18, 20 to be vertically adjusted.

Figure 5:
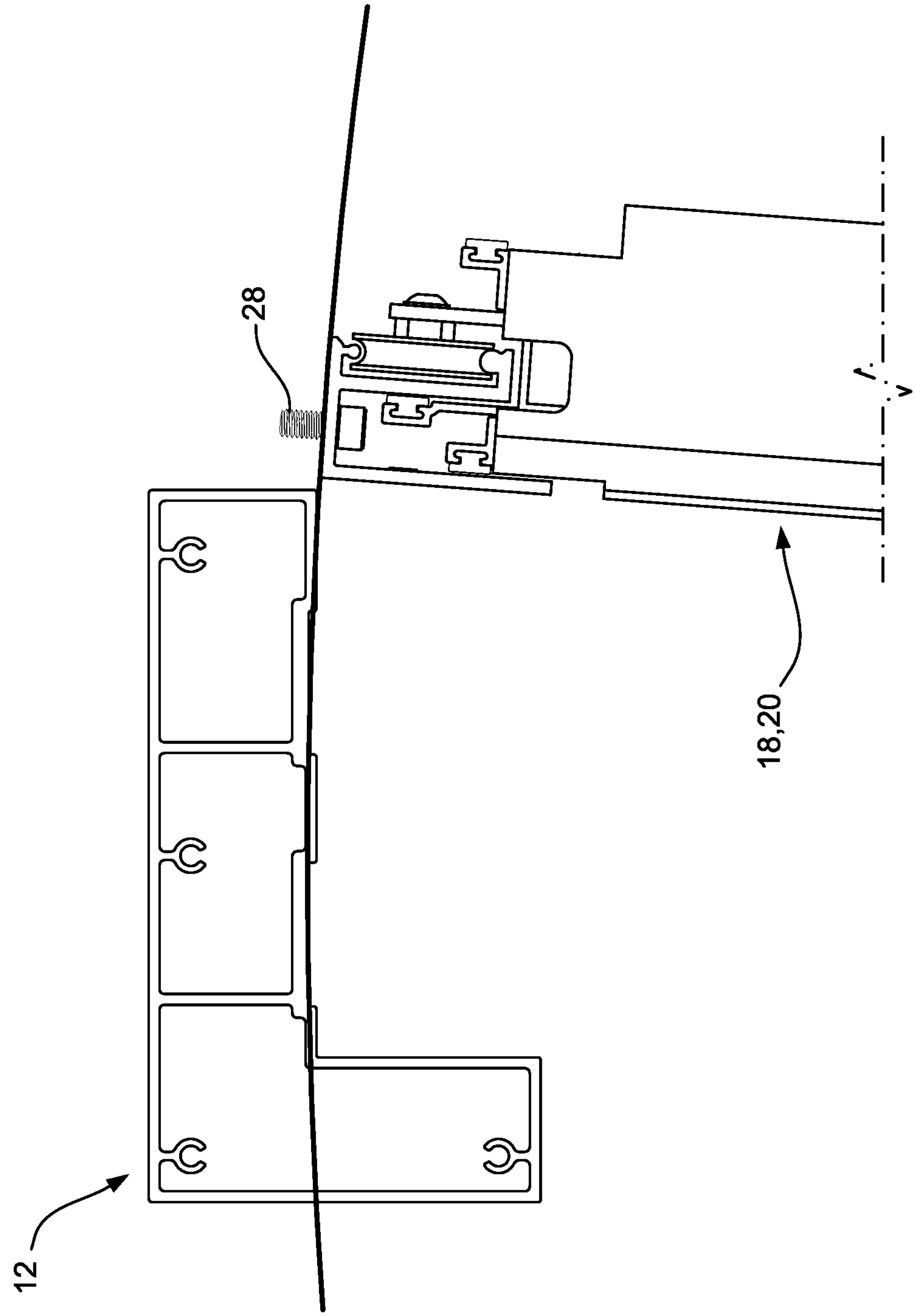
FIGS. 5 and 6 illustrate a procedure for removing the sliding panels.
Figure 6:
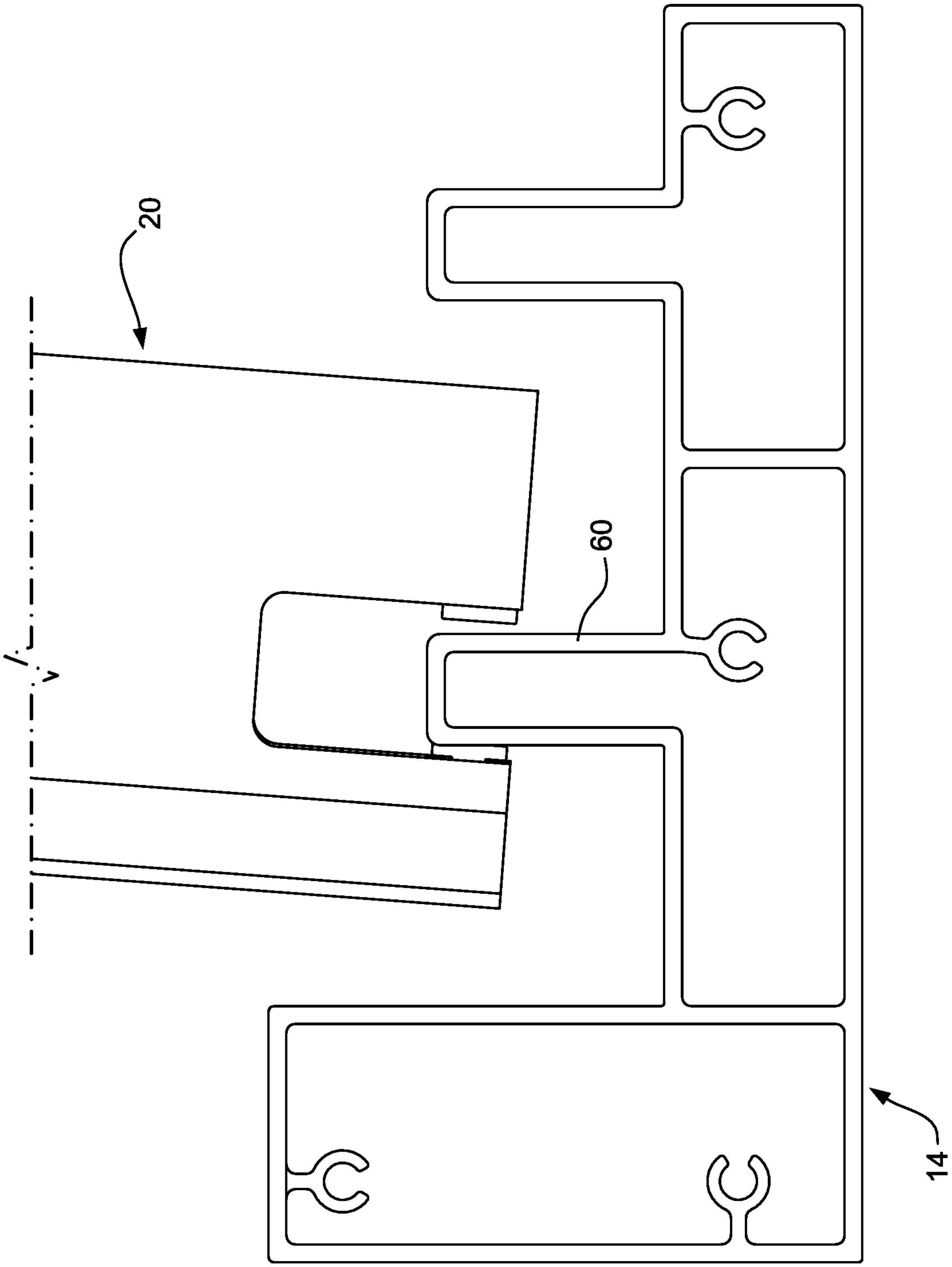
Figure 7:
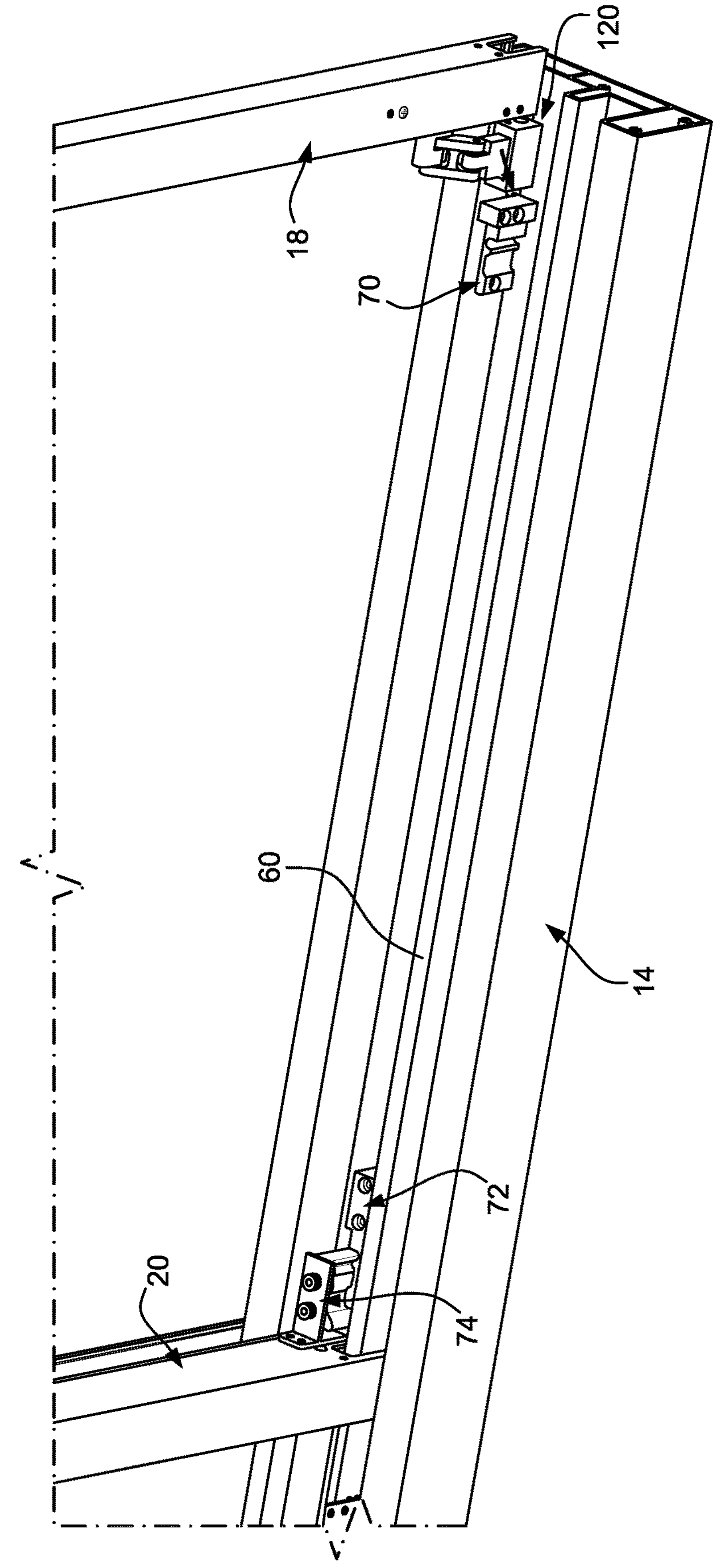
FIG. 7 shows an interlock mechanism cooperable with the door sill.

FIGS. 5 and 6 illustrate a procedure for removing the sliding panels 18, 20. As the bolts 28 are removed from the header 12, the sliding panels 18, 20 fall slightly on the rail 60, and the extrusions 26 are unseated from the recess 27 in the header 12. The sliding panels 18, 20 drop far enough onto the rail 60 to enable the entire assembly to be pivoted away from the top trim member 12 as shown in FIG. 5. Once the assembly is clear of the top trim member, the assembly can be lifted off of the rail 60 in the bottom sill 14 and removed.

Figure 8:
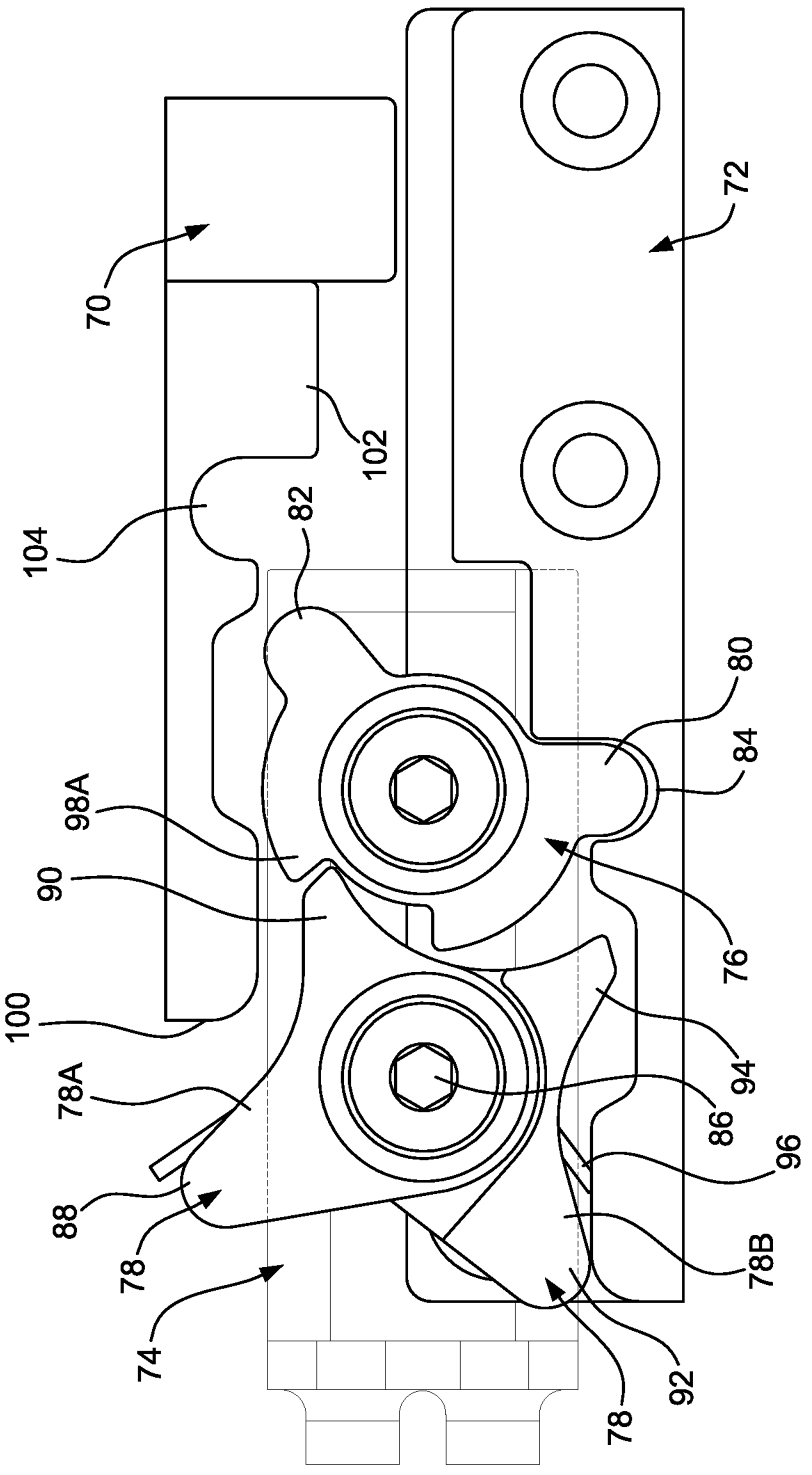
FIGS. 8-11 shows details of the interlock assembly.

An interlock mechanism will be described with reference to FIGS. 7-11. In a door assembly with multiple sliding doors, it is desirable to prevent the inside door from moving until the outermost door has reached a fully open position. Once the outermost door has reached its fully open position, it is then desirable for both doors to be displaced together. To achieve this functionality, an interlock mechanism includes a first interlock cam block 70 fixed to the outermost or primary sliding panel 18. The first interlock cam block 70 thus moves with the primary sliding panel 18. A second interlock cam block 72 is fixed to the bottom sill member 14. In the embodiment shown in FIG. 7, the second interlock cam block 72 is fixed to a side surface of the rail 60 to which the inside or secondary sliding panel 20 is engaged. The second interlock cam block 72 is thus fixed relative to the sliding panels 18, 20. An interlock assembly 74 is fixed to the secondary panel 20 and is thus displaceable with the panel 20. As shown in FIG. 8, the interlock assembly 74 includes an interlock cam 76 and a pair of interlock triggers 78. The interlock cam 76 includes a first cam tab 80 and a second cam tab 82. The interlock triggers 78 are made up of an upper part or plate 78A and a lower part or plate 78B secured on a common pivot axis 86. The upper part 78A includes a top trigger tab 88 and a lock tab 90, and the lower part 78B includes a bottom trigger tab 92 and a bottom lock tab 94. A spring 96 biases the interlock triggers 78 toward the position shown in FIG. 8.

With continued reference to FIG. 8, in the position shown, the tab 80 is engaging the recess 84, and the lock tab 90 is engaging a first lock surface 98A of the interlock cam 76. In this position, the secondary panel 20 to which the interlock assembly 74 is fixed is held in place by the engagement of the interlock assembly 74 to the second interlock cam block 72.

Figure 9:
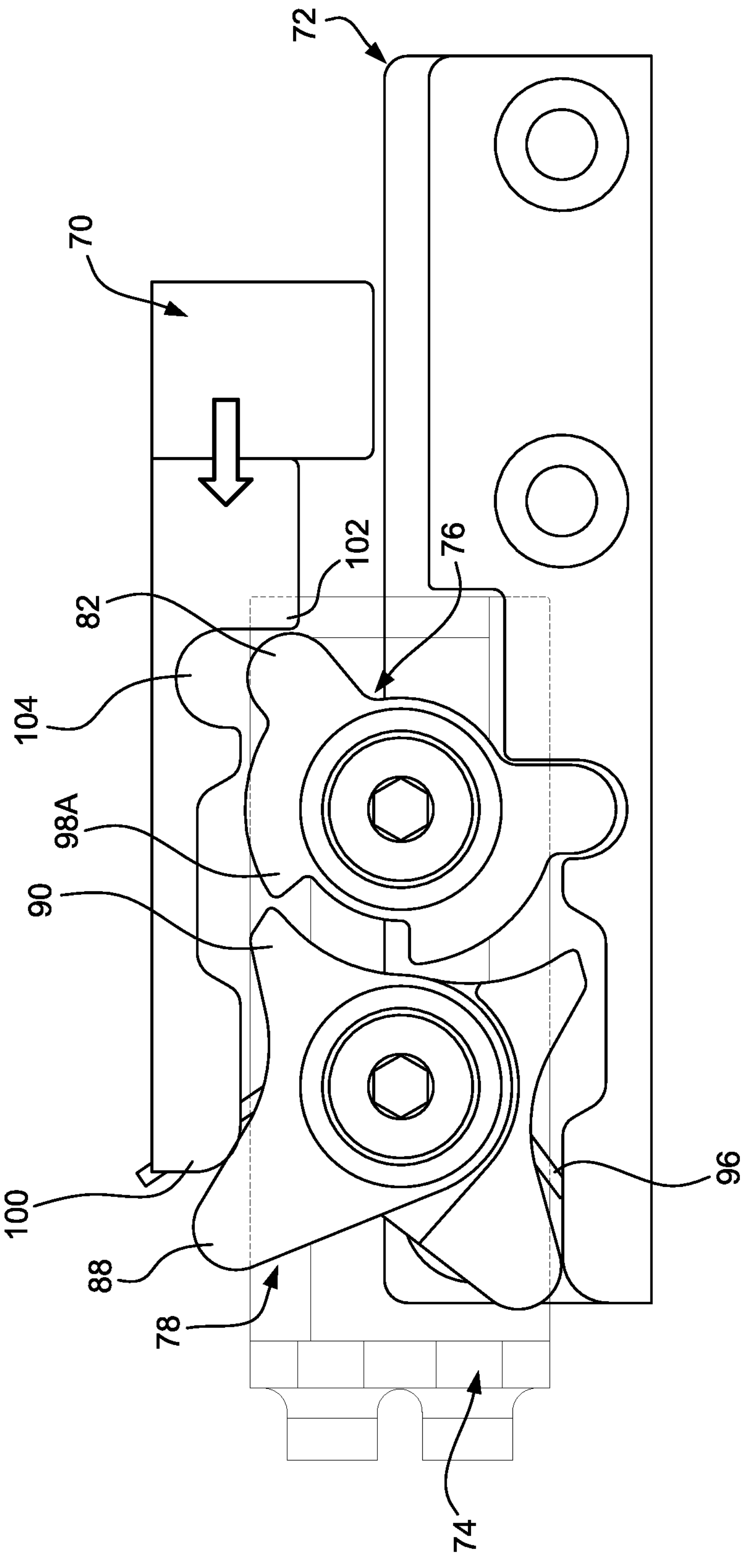
Figure 10:
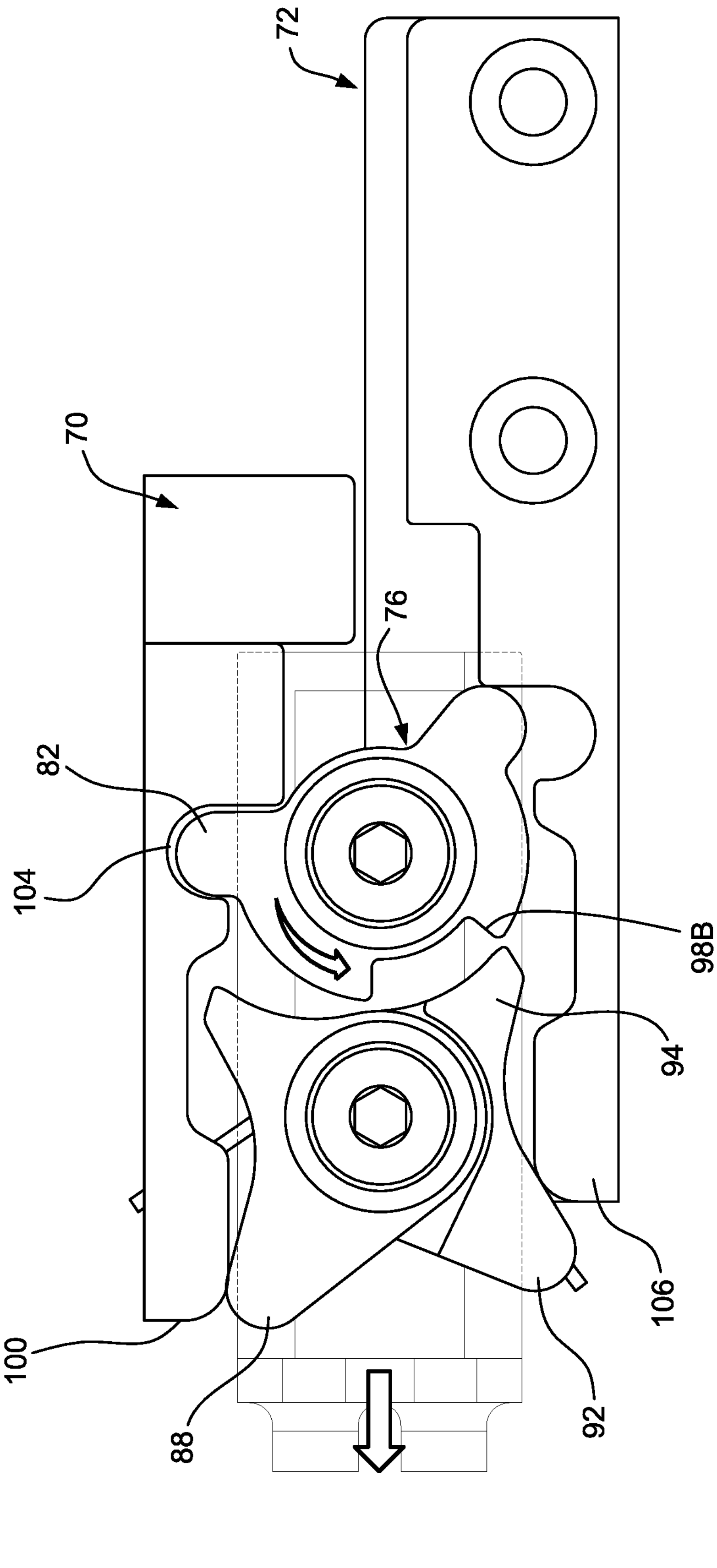
Figure 11:
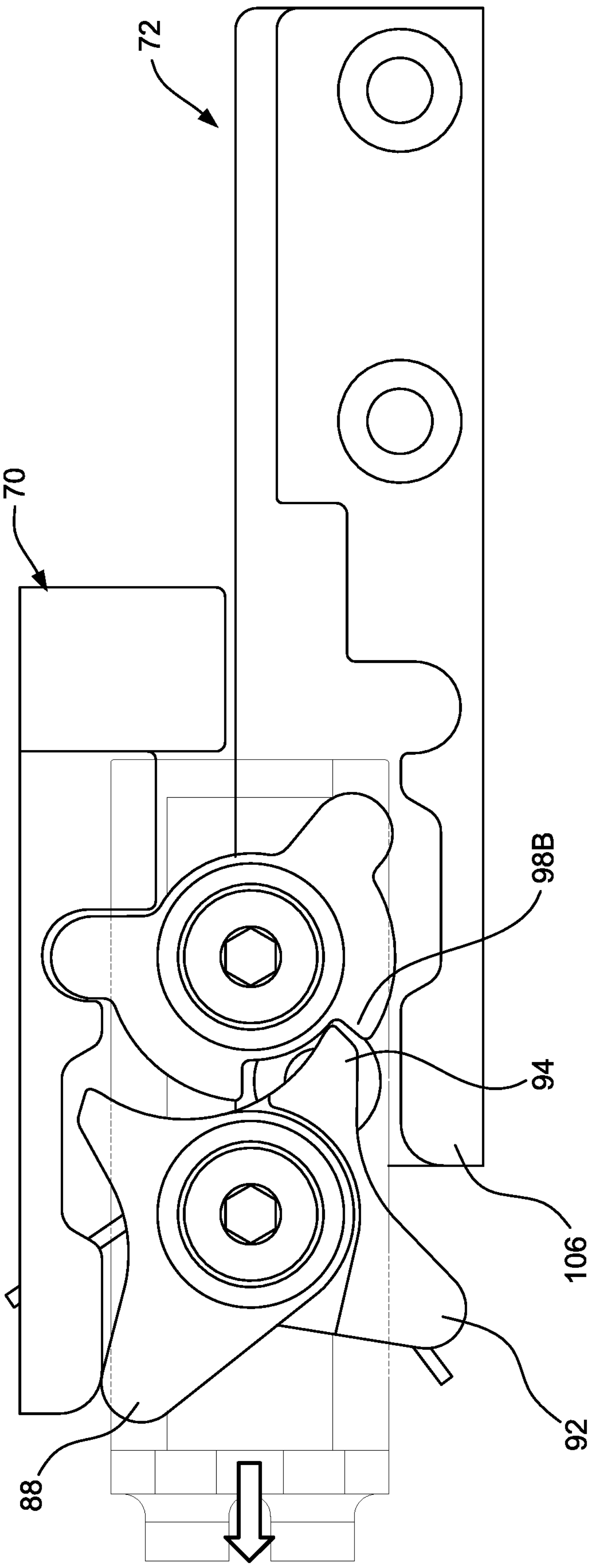

As the primary sliding panel 18 is opened, the first interlock cam block 70 approaches the interlock assembly 74. As shown in FIG. 9, a leading tab 100 of the first interlock cam block 70 engages the top tab 88 of the upper part 78A and displaces the part against the force of the spring 96 to release the lock tab 90 from the first lock surface 98A of the interlock cam 76. At about the same time, a push section 102 of the first interlock cam block 70 engages the second cam tab 82. With reference to FIG. 10, further displacement of the primary panel 18 causes the cam tab 82 to engage a recess 104 in the first interlock cam block 70. The interlock triggers function independent of each other. When the interlock cam 76 is rotated by cam block 70 so that the cam tab 82 is seated in the recess 104, the lower part 78B can rotate via force from the torsion spring 96 (counter clockwise in the FIG. 10) and cause the lock tab 94 to engage with the lock surface 98B. In a position shown in FIG. 11, the primary sliding panel 18 and the secondary sliding panel 20 are fixed together by the engagement between the interlock assembly 74 and the first interlock cam block 70. The primary and secondary panels 18, 20 can then be moved together to the maximum open position of the secondary panel 20.

A similar process works in reverse when the sliding panels 18, 20 are displaced toward a closed position. The secondary panel 20 disengages from the primary panel 18 and is re-fixed to the second interlock cam block 72, which is fixed to the sill 14. That is, from the position shown in FIG. 11, as the primary panel 18 is displaced toward the closed position (to the right in FIG. 11), a leading tab 106 of the second cam block 72 engages the tab 92 of the lower part 78B to release the lock tab 94 from the second lock surface 98B. As the first interlock cam block 70 is continued to be displaced with the primary panel 18 toward the closed position, the interlock assembly 74 re-assumes the position shown in FIG. 8, and the secondary panel 20 is subsequently fixed to the sill 14.

A brake assembly 120 is associated with the primary sliding panel 18. The brake assembly 120 is released via a handle 122 on the primary sliding panel 18 (FIG. 1) and is biased toward an engaged position such that when the handle 122 is released, the brake assembly 120 is engaged. In this manner, regardless of a position of the sliding panel 18, when the handle 122 is released, the brake 120 is engaged with the sill 14, and the sliding panel 18 is held in position.

Figure 12:
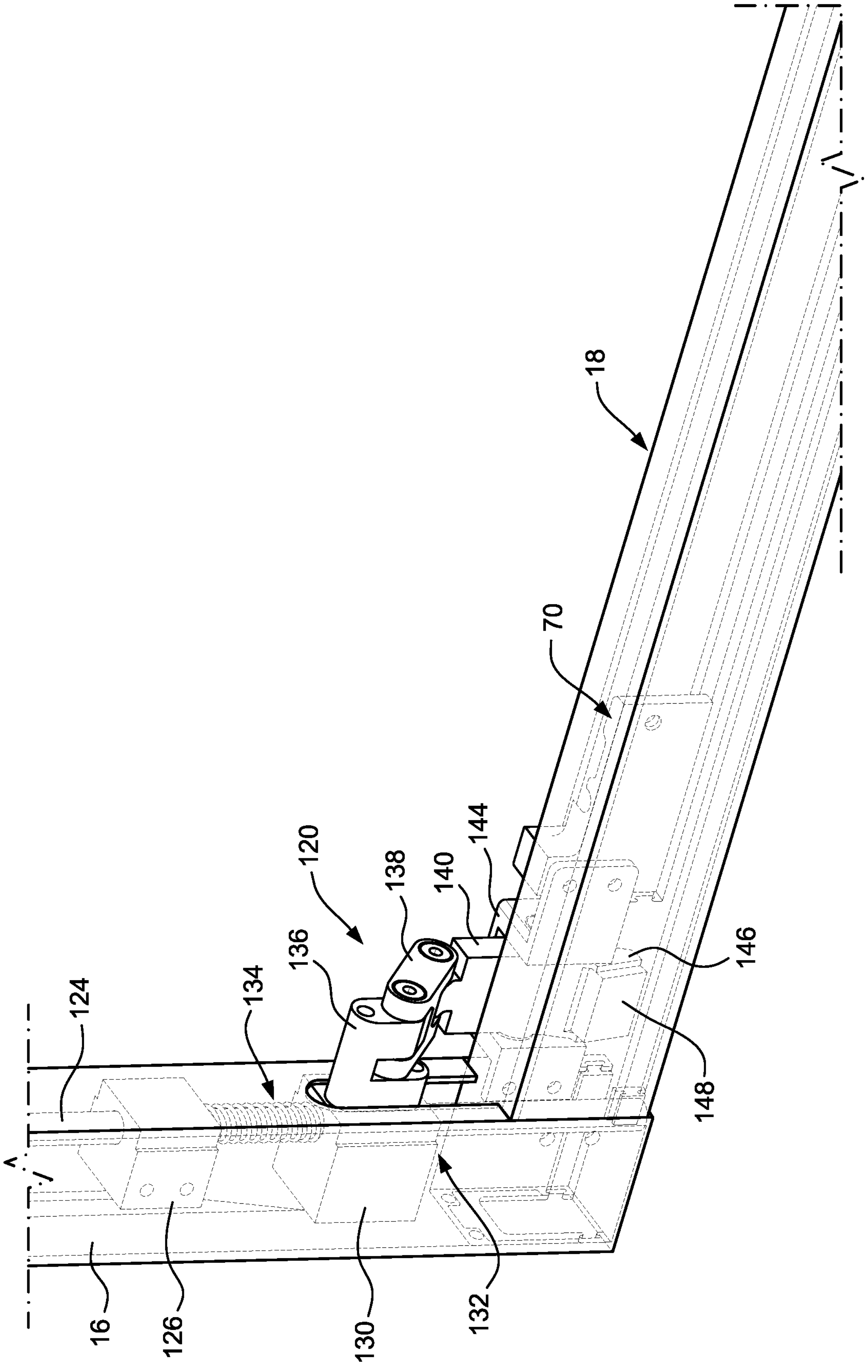
FIGS. 12 and 13 show a brake assembly associated with the primary sliding panel.
Figure 13:
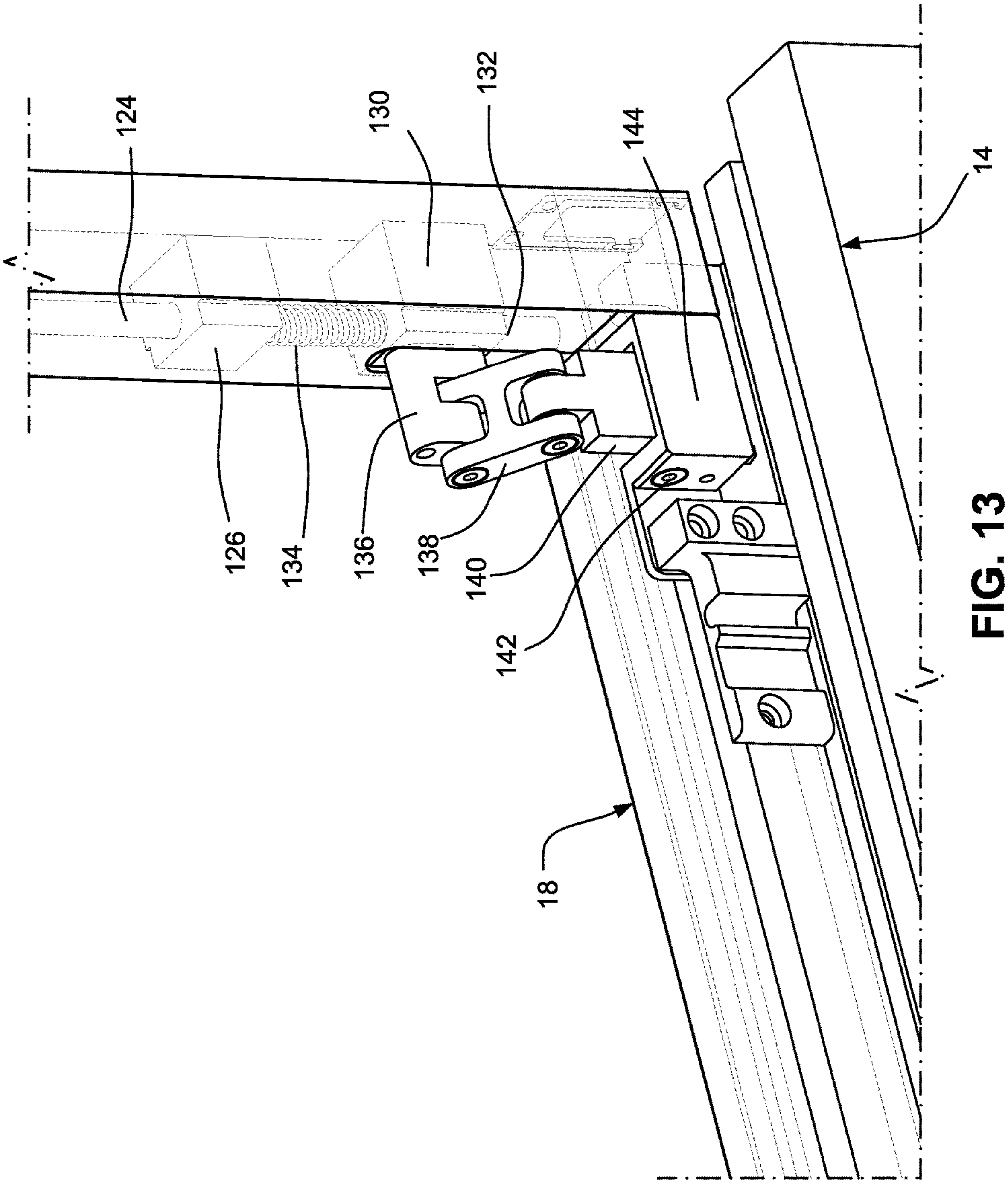

Details of an exemplary brake mechanism will be described with reference to FIGS. 12 and 13. A rod 124 is coupled with the handle 122 so that the rod 124 is displaced with the handle 122. In an exemplary construction, when the handle 122 is actuated (i.e., turned or pulled), the handle 122 displaces the rod 124 upward. The rod 124 extends through a block 126 that is fixed in place in the doorframe side jamb

16. The block 126 adds stability to the rod 124 and helps to keep the rod 124 in proper alignment.

The rod also extends through a second block 130 that is displaceable relative to the jamb 16 and the rod 124. The second block 130 sits on a collar 132 that is fixed to the rod 124. A spring 134 is disposed over the rod 124 between the first block 126 and the second block 130. The spring 134 acts on the second block 130 via the first block 126 to bias the mechanism toward an engaged position. That is, the block 126 acts as a positive stop, fixed to the door frame side jamb 16 for the spring 134 to push against.

A brake slide 136 is fixed to and displaceable with the second block 130, and an H-bar 138 is pivotably coupled at one end to the brake slide 136 and at an opposite end to a brake pivot arm 140. The brake slide 136 and the second block 130 may be constructed as one piece. The brake pivot arm 140 pivots on a pivot axis 142 (FIG. 13) defined by a pivot arm housing 144. The pivot arm housing 144 is fixed to a bottom trim member of the primary sliding panel 18.

A distal end of the brake pivot arm 140 includes a channel 146 defined by a bottom section and sidewalls as shown, and a brake pad 148 is secured in the channel 146. In some embodiments, the brake pad 148 is secured in the channel 146 via an adhesive.

In use, the spring 134 biases the brake assembly 120 to an engaged position. That is, with the handle 122 released, the spring 134 pushes against the second block 130 to displace the rod 124 downward. In the downward position, the brake slide 136 pushes the H-bar 138 down and out and pivots the brake pivot arm 140 so that the brake pad 148 engages the bottom sill 14. When the rod 124 is activated (e.g., by turning the handle 122), the rod 124 is pulled upward, and the collar 132 fixed to the rod 124 draws the second block 130 upward against the force of the spring 134. In a variation, the second block 130 could itself be fixed to the rod 124. The spring 134 is compressed by the second block 130 against the first fixed block 126. As the second block 130 is raised by the collar 132, the brake slide 136 is displaced upward, pivoting the H-bar 138 up and in to pivot the brake pivot arm 140 and thereby displace the brake pad 148 out of contact with the bottom sill 14. When the handle 122 is released, the spring 134 pushes down on the second block 130 to re-engage the brake pad 148. In this manner, regardless of a position of the door, at any time when the handle 122 is released, the brake assembly 128 is actuated to secure the primary sliding panel 18 in its current position. Of course, the brake assembly 120 could be equally functional on a door system with a single sliding panel.

Figure 14:
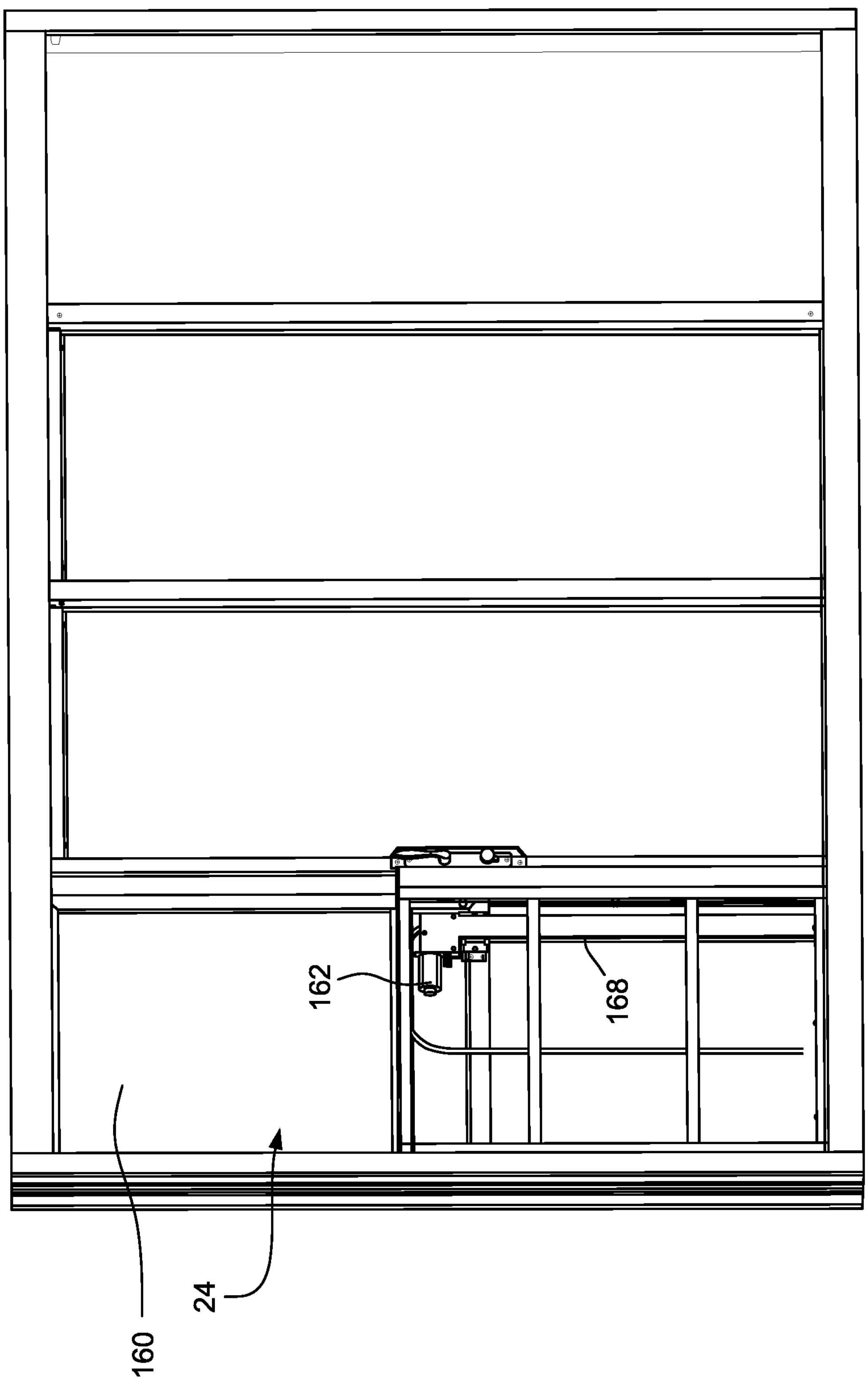
FIGS. 14-16 show an exemplary drop window included in the sliding door assembly.
Figure 15:
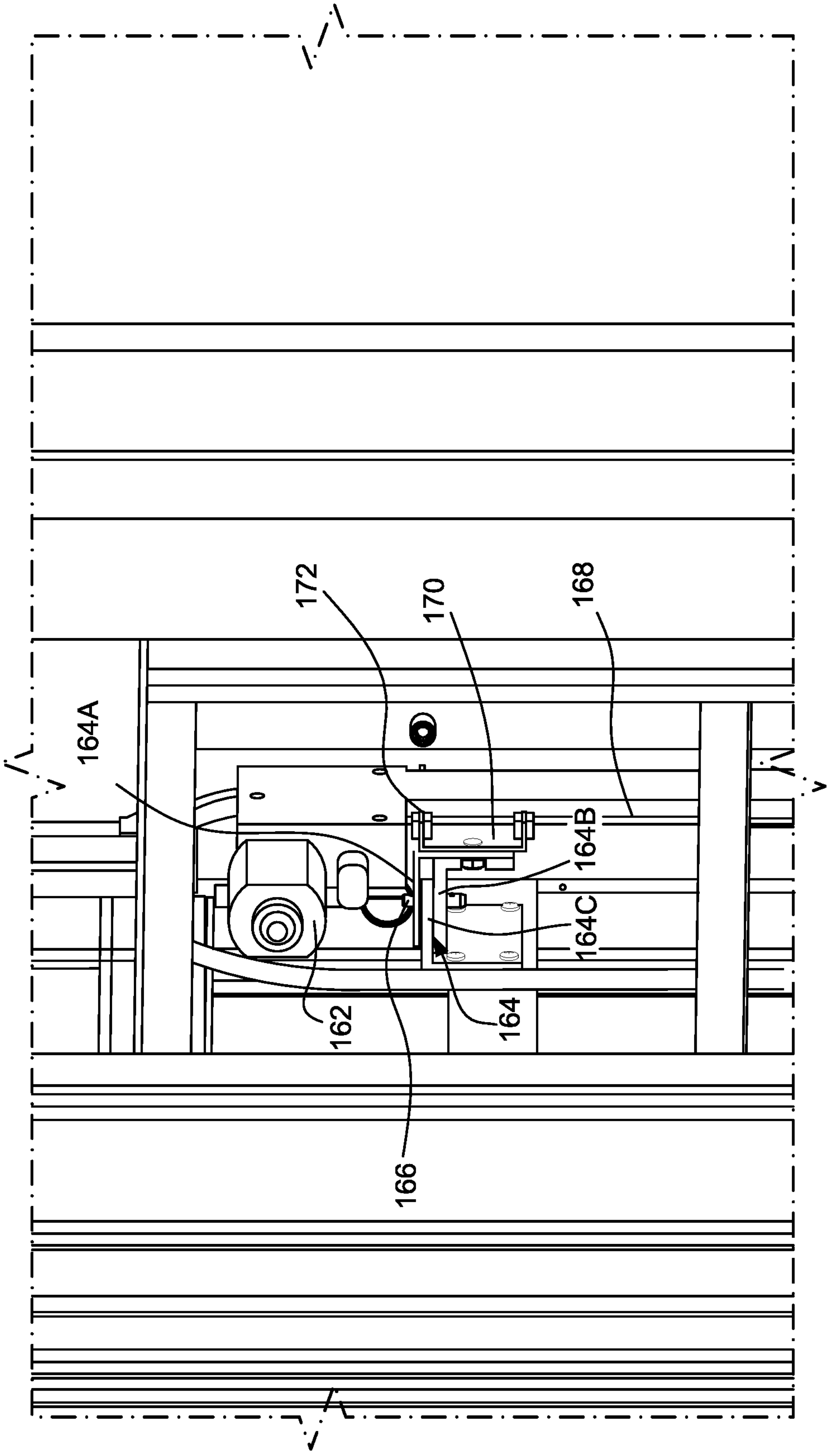
Figure 16:
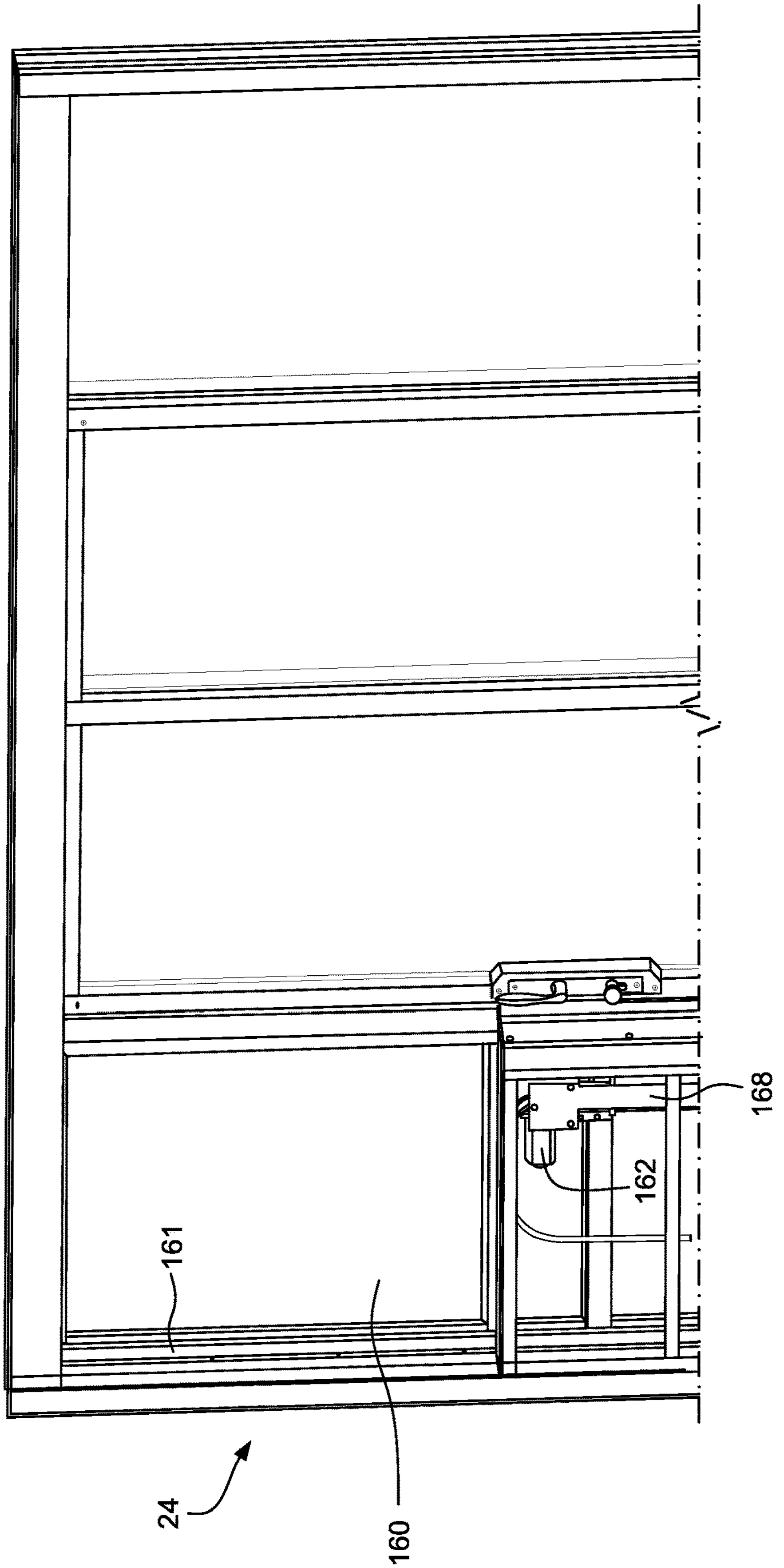

The drop window 24 will be described with reference to FIGS. 14-16. The drop window 24 includes a window panel 160 displaceable in a roller track 161 between a closed position (as shown in FIGS. 1 and 14) and an open position. A window motor 162 displaces the window panel 160. A coupling 164 connects the window motor 162 to the panel 160. The coupling 164 includes an upper plate 164A and a lower plate 164B connected to the motor and a center plate 164C connected to the window assembly. The coupling 164 is secured via a pull pin 166 or the like through the plates 164A, 164B, 164C, and the window assembly can be readily removed for replacement, maintenance or service by simply removing the pull pin 166 and the top half of the roller track 161. The window assembly can then be laterally removed from the casing (i.e., in the same direction as opening the door panels). Since the window panel is removable in the direction of the sliding doors, the window panel should be readily accessible as the door opening should be free of obstacles.

The window assembly is connected to a track 168 via a carriage 170. The coupling 164 through the pin 166 connects the window motor 162 to the carriage 170. The coupling 164 is configured to accommodate manufacturing tolerances in the frame assembly. For example, the pin 166 may be coupled through circular openings in the top plate 164A and the bottom plate 164B, and an oblong opening in the center plate 164C. Glides 172 associated with the track 168 do not allow the window to shift side-to-side, and in the event that the motor 162 is mis-mounted and/or the frame is substantially off square, the motor 162 may attempt to pull the window somewhat side-to-side. The oblong hole in the center plate 164C allows for some play as the window is raised and lowered to accommodate for these manufacturing tolerances and/or installation anomalies.

The motor 162 drives the carriage 170 via a spiral wound cable and a gear. This construction is exemplary, and other configurations for driving the window could be used.

To remove the window, the top half of the track 161 is removed, releasing the rollers. The rollers guide the window up and down and resist the rotation caused by the off-centered motor position, keeping the window going straight up and down even though there is no track or guide channel on the opposite side of the window. The lack of that guide or post leaves a cleaner more open feel to the space when the doors and window are open.

The door system of the described embodiments addresses several problems with existing constructions while also facilitating access to various moving parts for maintenance and repair. The interlock mechanism prevents a second sliding panel from being displaceable until engaging the first sliding panel in a max open position. The brake system secures the doors in place regardless of a position of the doors once the handle is released. The systems of the described embodiments are equally applicable to door assemblies including three or more sliding panels.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A sliding door assembly comprising:

a door frame including a top header, a bottom sill, and side jambs connected between the top header and the bottom sill;

a primary sliding panel secured in the door frame and including a top panel trim member, the top panel trim member defining a cavity;

a primary rail extrusion fixed to the top header, the primary rail extrusion including a top rail and a bottom rail;

a primary truck connected between the primary rail extrusion and the primary sliding panel, the primary truck being substantially U-shaped and disposed at least partly in the cavity of the top panel trim member;

a primary roller fixed to the primary truck and secured in rolling engagement with the bottom rail; and at least one seal positioned between the primary truck and the primary rail extrusion, wherein the primary roller is fixed to one leg of the substantially U-shaped truck, and wherein at least a portion of the seal is connected to an opposite leg of the U-shaped truck, wherein the bottom rail of the primary rail extrusion is configured to support a weight of the primary sliding panel, and wherein the top rail of the primary rail extrusion is cooperable with the primary roller and configured to prevent the primary sliding panel from assuming an off-track position.

2. The sliding door assembly according to claim 1, wherein the primary roller comprises a concave rolling surface.

3. The sliding door assembly according to claim 2, wherein the bottom rail is convex shaped in complement to the concave rolling surface, the top rail being disposed at least partially within an area defined by the concave rolling surface.

4. The sliding door assembly according to claim 1, wherein the primary truck is connected to the primary panel via a rivet nut and a hanger bolt.

5. The sliding door assembly according to claim 1, further comprising a secondary sliding panel secured in the door frame.

6. The sliding door assembly according to claim 5, further comprising:

a secondary rail extrusion fixed to the top header, the secondary rail extrusion including a top rail and a bottom rail;

a secondary truck connected between the secondary rail extrusion and the secondary sliding panel; and a secondary roller fixed to the secondary truck and secured in rolling engagement with the bottom rail.

7. The sliding door assembly according to claim 6, wherein the primary rail extrusion and the secondary rail extrusion are fixed to the top header side by side.

8. The sliding door assembly according to claim 1, wherein a height of the primary sliding panel in the door frame is adjustable.

9. The sliding door assembly according to claim 1, wherein the top panel trim member is secured to the primary truck via a bolt, wherein rotation of the bolt adjusts a position of the primary sliding panel relative to the top header.

10. A sliding door assembly comprising:

a door frame including a top header, a bottom sill, and side jambs connected between the top header and the bottom sill;

a sliding panel secured in the door frame and including a top panel trim member;

a rail extrusion fixed to the top header, the rail extrusion including a top rail and a bottom rail;

a truck connected to the top panel trim member and positioned between the rail extrusion and the top panel trim member; and a roller fixed to the truck and secured in rolling engagement with the bottom rail, wherein the top panel trim member is substantially U-shaped such that the truck extends at least partially into the U-shape and such that legs of the U-shape are at least partially disposed on opposite sides of the truck, wherein the truck is substantially U-shaped with the bottom of the U-shape disposed in the U-shape of the top panel trim member, one leg of the U-shape securing the roller, and an opposite leg of the U-shape securing a seal between the truck and the rail extrusion, wherein the primary roller comprises a concave rolling surface, and wherein the bottom rail is convex shaped in complement to the concave rolling surface, the top rail being disposed at least partially within an area defined by the concave rolling surface.

11. The sliding door assembly according to claim 10, wherein a rivet nut extends through a bottom of the truck and is connected to the top panel trim member via a hanger bolt.

12. The sliding door assembly according to claim 11, wherein the sliding panel is height adjustable via the hanger bolt and a jam screw.

13. The sliding door assembly according to claim 12, wherein the jam screw is threaded into the truck and is accessible via a hole in the top panel trim member.

14. The sliding door assembly according to claim 11, wherein the top panel trim member comprises upper flanges at ends of the U-shape that each include a T-slot configured to receive a glide and/or seal.

15. The sliding door assembly according to claim 10, wherein glass for the sliding panel is secured to the top panel trim member via an adhesive.

16. The sliding door assembly according to claim 10, further comprising a bottom trim member secured at a bottom of the sliding panel, wherein the bottom sill comprises a rail over which the bottom trim member is positioned, and wherein a height of the rail spans a height adjustment range for the sliding panel.

17. The sliding door assembly according to claim 16, wherein the bottom trim member comprises T-slots facing the rail in which glides and/or seals are disposed and engage opposite sides of the rail.

18. The sliding door assembly according to claim 10, further comprising a drop window, the drop window comprising:

a window panel movably secured in the door frame, the window panel being displaceable between a closed position and an open position;

a motor;

a track;

a carriage coupled with the track; and a coupling connecting the motor and the window panel, the coupling including top and bottom plates connected to the motor and the carriage, and the coupling including a center plate connected to the window panel.

19. A sliding door assembly comprising:

a door frame including a top header, a bottom sill, and side jambs connected between the top header and the bottom sill;

a sliding panel secured in the door frame and including a top panel trim member;

a rail extrusion fixed to the top header, the rail extrusion including a top rail and a bottom rail;

a truck connected to the top panel trim member and positioned between the rail extrusion and the top panel trim member; and a roller fixed to the truck and secured in rolling engagement with the bottom rail, wherein the top panel trim member is substantially U-shaped such that the truck extends at least partially into the U-shape and such that legs of the U-shape are at least partially disposed on opposite sides of the truck, wherein a rivet nut extends through a bottom of the truck and is connected to the top panel trim member via a hanger bolt, wherein the sliding panel is height adjustable via the hanger bolt and a jam screw, and wherein the jam screw is positionable to engage and stabilize the truck and the top panel trim member regardless of a height setting of the sliding panel by the hanger bolt, the jam screw serving to secure the truck and the top panel trim member in place.

* * * * *